United States Patent [19]

Hirabayashi

[11] Patent Number: 4,911,471
[45] Date of Patent: Mar. 27, 1990

[54] ARRANGEMENT OF AIR-BAG DEVICE IN MOTOR VEHICLE

[75] Inventor: Hirokazu Hirabayashi, Ebina, Japan
[73] Assignee: Nissan Motor Co., Ltd., Yokohama, Japan
[21] Appl. No.: 304,097
[22] Filed: Jan. 31, 1989
[30] Foreign Application Priority Data Feb. 9, 1988 [JP] Japan .................................. 63-28533

[51] Int. Cl.$^4$ ............................................. B60R 21/16
[52] U.S. Cl. ................................................... 280/732
[58] Field of Search ................. 280/728, 730, 731, 732
[56] References Cited

U.S. PATENT DOCUMENTS

| 3,767,229 | 10/1973 | Cain | 280/732 |
| 3,794,349 | 2/1974 | Fuller | 280/732 |
| 3,817,552 | 6/1974 | Knight et al. | 280/732 |
| 3,944,250 | 3/1976 | Wulf et al. | 280/732 |

FOREIGN PATENT DOCUMENTS 58-76344 5/1983 Japan .

Primary Examiner—Kenneth R. Rice
Attorney, Agent, or Firm—Pennie & Edmonds

[57] ABSTRACT

Disclosed herein is an arrangement of an air-bag device in a motor vehicle having a passenger room, a windshield and an instrument panel. The arrangement comprises a first structure defining an opening in an upper part of the instrument panel; a base member secured to a fixed member of the vehicle and located at a position below the opening; a gas generator mounted on the base member for generating gas when operated; an air-bag held by the base member, the air-bag being exposed through the opening to the passenger room and fully expanded in the same when the gas generator operates; a lid member for covering the opening of the instrument panel, the lid member being pivoted up to open when pressed by the air-bag under expansion; and a second structure for restricting the opening angle of the lid member relative to the upper part of the instrument panel thereby to direct the air-bag under expansion toward a desired position of the passenger room.

14 Claims, 2 Drawing Sheets

ARRANGEMENT OF AIR-BAG DEVICE IN MOTOR VEHICLE

BACKGROUND OF THE INVENTION

1. Field of the Invention

The present invention relates in general to safety devices for a motor vehicle, and more particularly to air-bag devices mounted in the motor vehicle. More specifically, the present invention is concerned with an arrangement of the air-bag device, which is suitable for protecting a passenger seated on a so-called co-driver's seat of the vehicle.

2. Description of the Prior Art

In order to clarify the task of the present invention, one conventional arrangement of air-bag device will be outlined prior to making a detailed description of the present invention, which is shown in Japanese Patent First Provisional Publication No. 58-76344.

In the arrangement shown by the publication, the air-bag device is housed inside of a vertically extending instrument panel in front of the co-driver's seat. Upon expansion of the air-bag, a lid member provided on the instrument panel is forced to open permitting full expansion of the air-bag in the passenger room.

However, the arrangement shown by the publication seems to have been thought out without taking the need for compactness of the same into consideration. In fact, providing such arrangement on the instrument panel narrows the space inside of the instrument panel very much and thus makes provision of a glove box in the space substantially impossible.

SUMMARY OF THE INVENTION

It is therefore an object of the present invention to provide an arrangement of an air-bag device, which is compactly installed inside of an instrument panel thereby providing the inside of the instrument panel with a sufficient space for the glove box.

According to one aspect of the present invention, there is provided an arrangement of an air-bag device, in which a lid member for covering the air-bag in a folded condition is located at an upper part of the instrument panel.

According to another aspect of the present invention, there is provided means by which the opening angle of the lid member is restricted for directing the expanding air-bag away from a windshield of the vehicle.

According to the present invention, there is provided an arrangement of an air-bag device in a motor vehicle having a passenger room, a windshield and an instrument panel. The arrangement comprises first means defining an opening in an upper part of the instrument panel; a base member secured to a fixed member of the vehicle and located at a position below the opening; a gas generator mounted on the base member for generating gas when operated; an air-bag held by the base member, the air-bag being exposed through the opening to the passenger room and fully expanded in the same when the gas generator operates; a lid member for covering the opening of the instrument panel, the lid member being pivoted up to open when pressed by the air-bag under expansion; and second means for restricting the opening angle of the lid member relative to the upper part of the instrument panel thereby to direct the air-bag under expansion toward a desired position of the passenger room.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
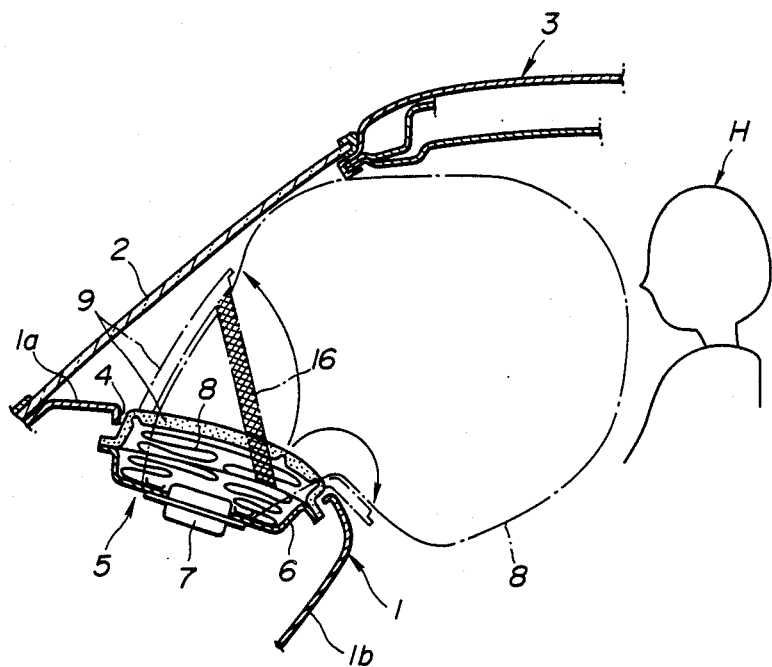
FIG. 1 is a sectional view of the arrangement of air-bag device according to the present invention.

In the following, an embodiment of the present invention will be described in detail with reference to FIGS. 1 to 4.

In the drawings, denoted by numeral 1 is an instrument panel which is exposed to a passenger room of a motor vehicle. Denoted by numeral 2 is a windshield which has an upper edge engaged through a seal (no numeral) with a roof panel 3 of the vehicle.

As is seen FIG. 1, the instrument panel 1 has a smoothly curved upper part 1a and a downwardly extending lower part 1b.

The upper part 1a of the instrument panel 1 is formed, at a portion near a co-driver's seat, with an opening 4 for receiving therein an air-bag device 5.

Figure 2:
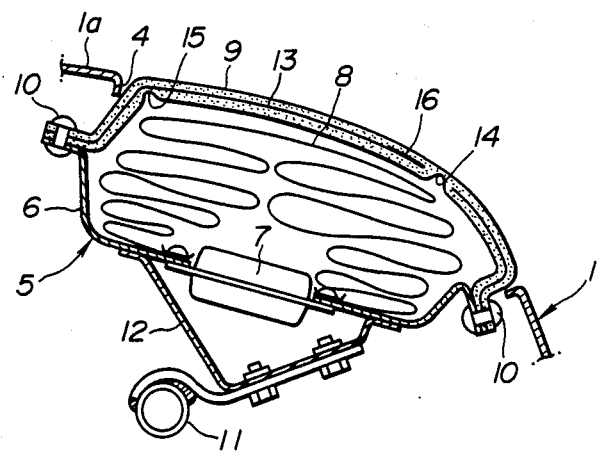
FIG. 2 is an enlarged sectional view of an essential part of the arrangement.

As is best shown in FIG. 2, the air-bag device 5 comprises a tray-like base plate 6, a gas generator 7 secured to a bottom of the base plate 6, an air-bag 8 secured at its mouth portion to the base plate 6 having the gas generator 7 exposed to the interior of the air-bag 8, and a cover 9 covering the air-bag 8 in a folded condition. The cover 9 is constructed of a molded polyurethane board reinforced by an insert of cloth 13. The base plate 6 and the cover 9 have their peripheral portions connected by bolts 10 and nuts. The base plate 6 is connected through a bracket 12 to a steering column support member 11 and arranged in such a manner that an upper surface of the cover 9 is flush with the outer surface of the curved upper part 1a of the instrument panel 1.

Figure 3:
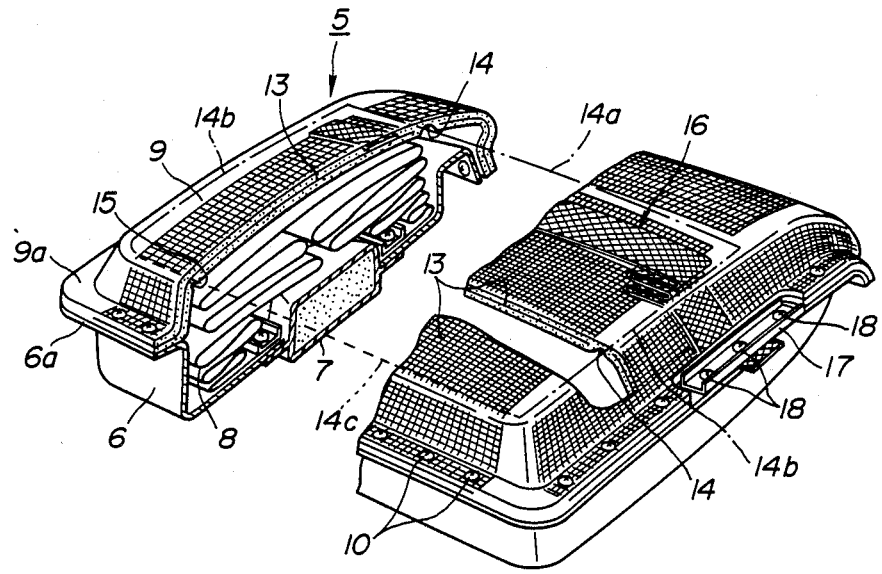
FIG. 3 is a partially broken perspective view of the air-bag device.
Figure 4:
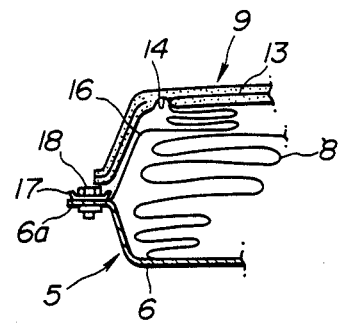
FIG. 4 is a sectional, but partial, view of the air-bag device, showing a portion where a lid portion opening degree restricting means is provided.

As will be understood from FIG. 3, the cover 9 is formed at its back side with a rectangularly extending groove 14 (as indicated by phantom and broken lines in the drawing) which consists of a rear section 14a side sections 14b and a front section 14c. The rear section 14a and the side sections 14b of the groove 14 are formed on the part where the reinforcing cloth 13 is not provided, and thus these sections 14a and 14b While, the front section 14c of the groove 14 is formed on the part where the reinforcing cloth 13 is provided, so that upon breakage of the easily breakable portion, the front section 14c serves as a hinge. That is, upon expansion of the air-bag 8, the breakable portion is broken causing a rectangular center part of the cover 9, viz., a lid portion, to pivot upward about the front hinge part 14c, as will be understood from FIG. 1.

According to the present invention, there is further provided a so-called "lid opening degree restricting means" which restricts or adjusts the opening angle of the lid portion for achieving a desired expansion of the air-bag 8.

That is, as is seen from FIG. 3, a strap 16 of woven cloth is employed, which has both ends connected to side portions of the base plate 6 through bolts 18 and nuts. Retainer plates 17 are used for assuring the connection, as shown. The strap 16 has a middle part secured to a free part of the lid portion of the cover 9. Preferably, the middle part of the strap 16 is sewed to the reinforcing cloth 13 embedded in the lid portion. More specifically, as is seen from FIG. 4, the longitudinal side portions of the strap 16 are exposed to the back side of the cover 9 and, when the air-bag device is in its rest condition, folded loosely within the device. The length of the strap 16 is so determined that, upon full expansion of the air-bag 8, the lid portion of the cover 9 thus raised is prevented from making full opening thereof. This is for allowing the raised lid portion to direct the expanding air-bag 8 toward a desired position in the passenger room. In other words, the provision of the strap 16 prevents the expanding air-bag 8 from directly hitting against the windshield 2.

In the following, operation of the air-bag device will be described.

In a rest condition of the air-bag device, the same assumes the position as shown in FIG. 2 wherein the upper surface of the cover 9 is substantially flush with the outer surface of the instrument panel 1.

When, due to a vehicle collision or the like, a deceleration sensor (not shown) issues a signal, the gas generator 7 generates a gas and thus expands the air-bag 8. Due to the expansion of the air-bag 8, the easily breakable portion (that is, the lid portion) of the cover 9 is broken and thus pivotally raised about the front hinge part 14c exposing the expanding air-bag 8 to the passenger room. However, due to provision of the strap 16, the opening angle of the lid portion is restricted to such a degree that the expanding air-bag 8 is directed away from the windshield 2, that is, toward a passenger H seated on the co-driver's seat.

Advantages of the present invention will be described in the following.

First, since the air-bag device is compactly mounted on the upper part 1a of the instrument panel 1, providing a space for a glove box inside the instrument panel 1 is easily achieved.

Second, because of provision of the strap 16, the opening degree of the lid portion of the cover 9 is restricted. Thus, the air-bag 8 under expanding is prevented from directly hitting against the windshield 2.

Third, because of provision of the strap 16 by which the lid portion is suspended at a given angle, the lid portion can serve as a guide means for the expanding air-bag 8. In fact, by the raised lid portion, the air-bag 8 under expansion is directed toward the co-driver's seat to effectively support a passenger H, as is seen from FIG. 1.

What is claimed is:

1. In a motor vehicle-having a passenger room, a windshield and an instrument panel, an arrangement of an air-bag device comprising:

first means defining an opening in an upper part of said instrument panel;

a base member secured to a fixed member of the vehicle and located at a position below said opening;

a gas generator mounted on said base member for generating gas when operated;

an air-bag held by said base member, said air-bag being exposed through said opening to the passenger room and fully expanded in the same when said gas generator operates;

a lid member for covering said opening of the instrument panel, said lid member being pivoted up to open when pressed by said air-bag under expansion; and second means for restricting the opening angle of said lid member relative to said upper part of said instrument panel thereby to direct the air-bag under expansion toward a desired position of the passenger room.

2. An arrangement as claimed in claim 1, in which said lid member has a hinge portion about which said lid member pivots.

3. An arrangement as claimed in claim 2, in which said second means comprises a strap which connects said lid member to said base member.

4. An arrangement as claimed in claim 3, in which said strap has longitudinal both ends secured to said base member and a middle part secured to said lid member.

5. An arrangement as claimed in claim 4, in which said middle part of said strap is secured to a free end of said lid member.

6. An arrangement as claimed in claim 5, in which said lid member is a part of a cover structure constructed of molded polyurethane board, said part being bounded by an easily breakable rectangularly extending grooved portion provided by said cover structure.

7. An arrangement as claimed in claim 6, in which said cover structure is reinforced by a cloth embedded therein.

8. An arrangement as claimed in claim 7, in which said easily breakable grooved portion is free of said cloth.

9. An arrangement as claimed in claim 8, in which said hinge portion of said lid member is provided with said cloth.

10. An arrangement as claimed in claim 9, in which said middle part of said strap is sewed to said cloth.

11. An arrangement as claimed in claim 10, in which said cover structure has a peripheral portion secured to a peripheral portion of said base member.

12. An arrangement as claimed in claim 11, in which said cover structure has an upper surface which is substantially flush with the outer surface of the upper part of said instrument panel.

13. An arrangement as claimed in claim 12, in which said base member is connected to a steering column support member through a bracket.

14. An arrangement as claimed in claim 13, in which said strap is constructed of woven cloth.

* * * * *